United States Patent [19]
Johnston

[11] Patent Number: 5,738,193
[45] Date of Patent: Apr. 14, 1998

[54] ROLLER CLUTCH WITH SNAP FIT ROLLER CONTROL CARS

[75] Inventor: Albert David Johnston, Huron, Ohio

[73] Assignee: General Motors Corporation, Detroit, Mich.

[21] Appl. No.: 684,961

[22] Filed: Jul. 19, 1996

[51] Int. Cl.⁶ .................................................. F16D 41/06
[52] U.S. Cl. .................................................. 192/45
[58] Field of Search .............................. 192/45, 41 R, 192/45.1; 188/82.84

[56] References Cited

U.S. PATENT DOCUMENTS

| | | | |
|---|---|---|---|
| 4,821,856 | 4/1989 | Lederman | 192/45 |
| 4,893,702 | 1/1990 | Lederman | 192/45 |
| 4,901,833 | 2/1990 | Lederman | 192/45 |
| 4,921,084 | 5/1990 | Lederman | 192/45 |
| 4,924,980 | 5/1990 | Lederman | 192/45 |
| 4,924,981 | 5/1990 | Johnston et al. | 192/45 |
| 4,993,528 | 2/1991 | Lederman | 192/45 |

*Primary Examiner*—Rodney H. Bonck
*Attorney, Agent, or Firm*—Patrick M. Griffin

[57] ABSTRACT

A roller control car type roller clutch with simplified installation of cars to cage. Each cage pocket includes a pair of parallel, axially flexible side rails arrayed generally along the shallow arcuate travel path of a roller. Each control car fits closely between the side rails, in their free and unflexed state, and includes a track which forces the rails axially apart when the cars are pushed radially in between the rails in a straight line motion. The rails snap back and into the track to slidably capture the cars. Neither the roller nor the spring is necessary to the retention of car to cage, and the car need not be carefully aligned with the rails before installation.

3 Claims, 3 Drawing Sheets

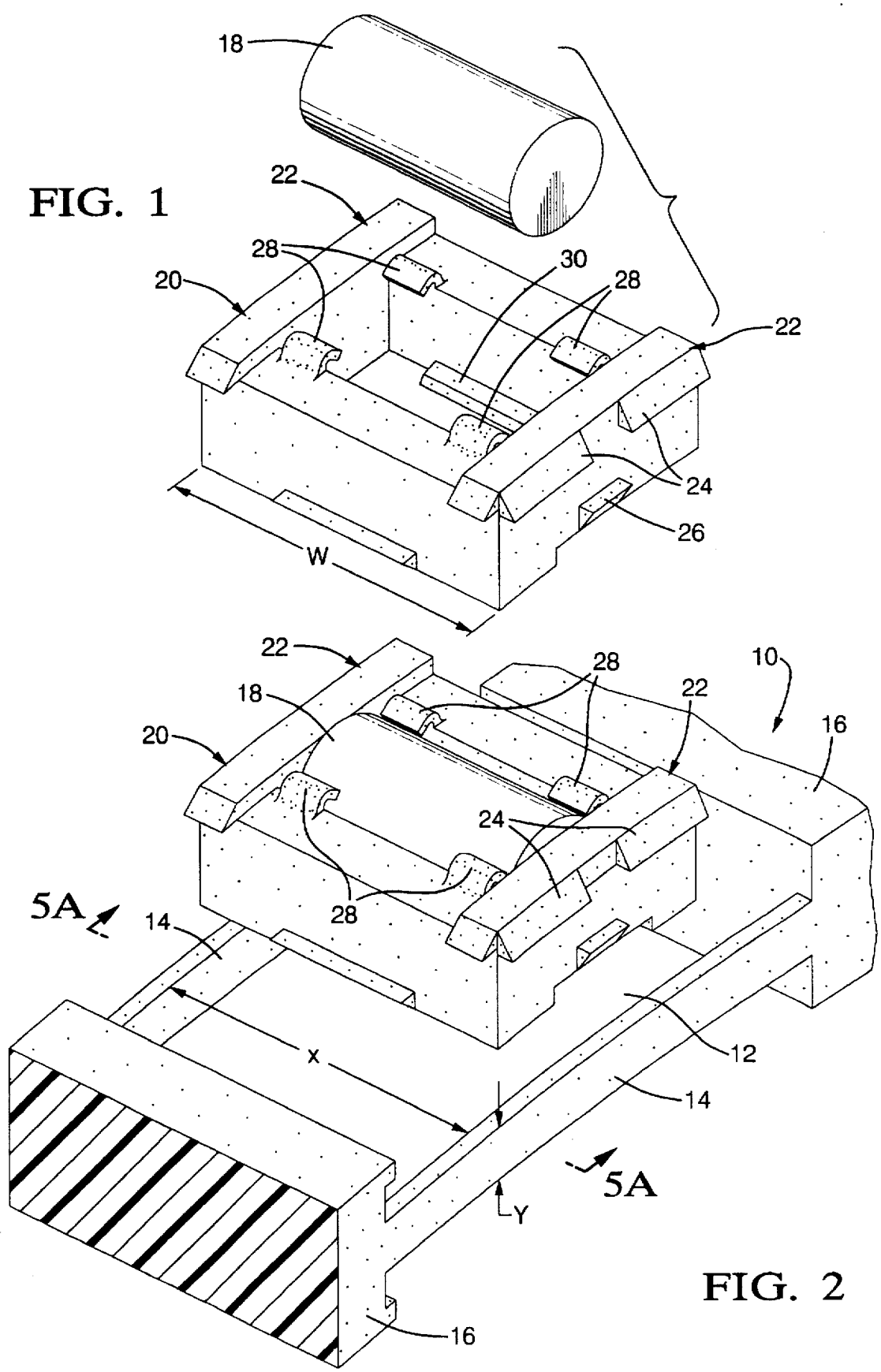

ROLLER CLUTCH WITH SNAP FIT ROLLER CONTROL CARS

This invention relates to control car type roller clutches in general, and specifically to such a clutch in which the control cars are easily installed to the clutch cage by a simple, straight push and snap fit.

BACKGROUND OF THE INVENTION

A significant development in one way roller clutches within the last few years has been the so called control car roller clutch, first used by the assignee of the subject invention. In the basic design, each roller, rather than sitting alone within a cage pocket, is closely contained within a dedicated, generally rectangular car, which moves with the roller as it moves. Each car slide back and forth between closely fitting, axially spaced side rails of the cage pocket. At a minimum, the combination of a close fit of roller within car, and car within side rails, serves to keep the rollers well aligned to the cage and clutch axis during operation, better aligned that the roller ends alone could do. The car can serve many other functions as well, as disclosed in numerous existing patents. It can insulate and armor the ends of the rollers from the side rails. If the roller, besides being surrounded by the car, is actually held and retained by the car, and if the car is also somehow retained to the pocket side rails, then the entire clutch is robustly held together as a unit for easy shipping and handling. Several clutch designs shown in co assigned U.S. patents do this. Generally, the roller is simply pop fitted into the car, which is simple to do if the car is molded plastic. The roller is held closely enough within the car so as not to fall out of the car prior to clutch installation, but loosely enough to be able to roll about its own axis during clutch operation. The car may be retained in the pocket in several different ways.

One car to cage retention scheme locks the cars into the pockets temporarily with releasable latches. Since one of the clutch races is often installed with a twisting action that serves to simultaneously shift all of the rollers in one direction, this roller shifting can be used to disengage all of the latches at once, freeing the cars to slide freely between the side rails. This can obviously only be used with clutches that have a race installed with a twisting motion. Two co assigned U.S. patents that show releasable latch designs are U.S. Pat. No. 4,821,856 to Lederman issued Apr. 18, 1989 and U.S. Pat. No. 4,921,084 to Lederman issued May 1, 1990.

Another basic approach is to somehow retain the cars slidably to the pocket slide rails, like file drawer rollers in a track, rather than just between the side rails, like books on a shelf. The difficulty with this approach resides in the fact that the axial overlap between the cars and the pocket side rails that creates the retention action also makes it difficult to insert the cars between the side rails in the first place. One solution, shown in co assigned U.S. Pat. No. 4,924,980 to Lederman issued May 15, 1990 is to provide pocket side rails and cage side flanges which, while they axially overlap, do not overlap on both radial sides of the side rails. Instead, the pocket side rails and car side flanges are molded in a complementary "over-under" relationship, which also happens to very amenable to the most practical plastic injection molding process. This allows the car side flanges to be radially and then axially shifted into alignment with the pocket side rails, along straight and right angle paths, after which, the pop fitting of the roller into the car will keep them axially aligned, overlapped, and mutually slidably retained.

The solution that has proved most practical in actual production use, however, is that shown in the companion design U.S. Pat. No. 4,924,981 to Johnston et al. issued May 15, 1990. There, similarly shaped cars are tilted and rotated into position between the pocket side rails, rather than being inserted along a right angle, L shaped path. As this occurs, small retention tabs on the cars move freely into and through aligned clearance slots located near one end of the pockets. Then, when the cars are shifted to the opposite end of the pockets, the tabs move away from the slots, slidably capturing the cars onto the side rails, like file drawers into a track. Finally, the springs are added to keep the tabs away from the slotted ends of the pockets, thereby keeping the cars on track. The problem with this assembly technique is that a tipping and rotating motion of the cars is not as easy to automate as the simpler, L shaped, right angle path. Furthermore, if the tabs are not precisely aligned with the slots circumferentially, they may be broken off as the car is rotated forcibly into position.

SUMMARY OF THE INVENTION

The invention provides a control car type roller clutch design in which the cars are slidably retained to the pocket side rail, but installed by a simple snap fit achieved with a simple, straight line radial motion. The cars also need not be precisely circumferentially aligned with the roller pockets during installation.

In the preferred embodiment disclosed, each molded plastic cage pocket has a pair of axially spaced, parallel side rails, generally arrayed along the arcuate travel path of the rollers. Rather than being axially thick and rigid, however, the side rails are axially thin enough to be axially flexible relative to one another, at least over a small distance, out of their normal or free state separation. Each generally box shaped roller car closely retains a roller, end to end between parallel end bars which fit closely between the inner surfaces of the unflexed cage side rails. The outer surfaces of each of the cat's end bars are also molded with a set of radially spaced ribs that create a track capable of containing and sliding on the side rails.

To get the pocket side rails into the tracks of the cars, all that is necessary is to align the cars axially between the side rails and then push the cars radially straight in. The ribs wedge and flex the side rails apart until they snap in between the ribs, after which the cars are slidably retained to the rails. The cars can be pushed radially in or out between the side rails, and no accurate circumferential positioning or twisting of the cars is necessary. Furthermore, neither the spring nor the roller is necessary to the retention of the car in the pocket, and these can be installed at any time. With a simple pop fit of the roller into the car, and a conventional capturing of the springs between the cars and the pockets, all components are securely retained together prior to clutch installation. During clutch operation, the sliding of the cars on the pocket side rails follows the travel path of the roller.

DESCRIPTION OF THE PREFERRED EMBODIMENTS

These and other features of the invention will appear from the following written description, and from the drawings, in which:

FIG. 1 is a perspective view of a car and roller before the roller is fitted into the car;

FIG. 2 is a perspective view of a car (with roller) before it is installed between a pair of pocket side rails;

Figure 3:
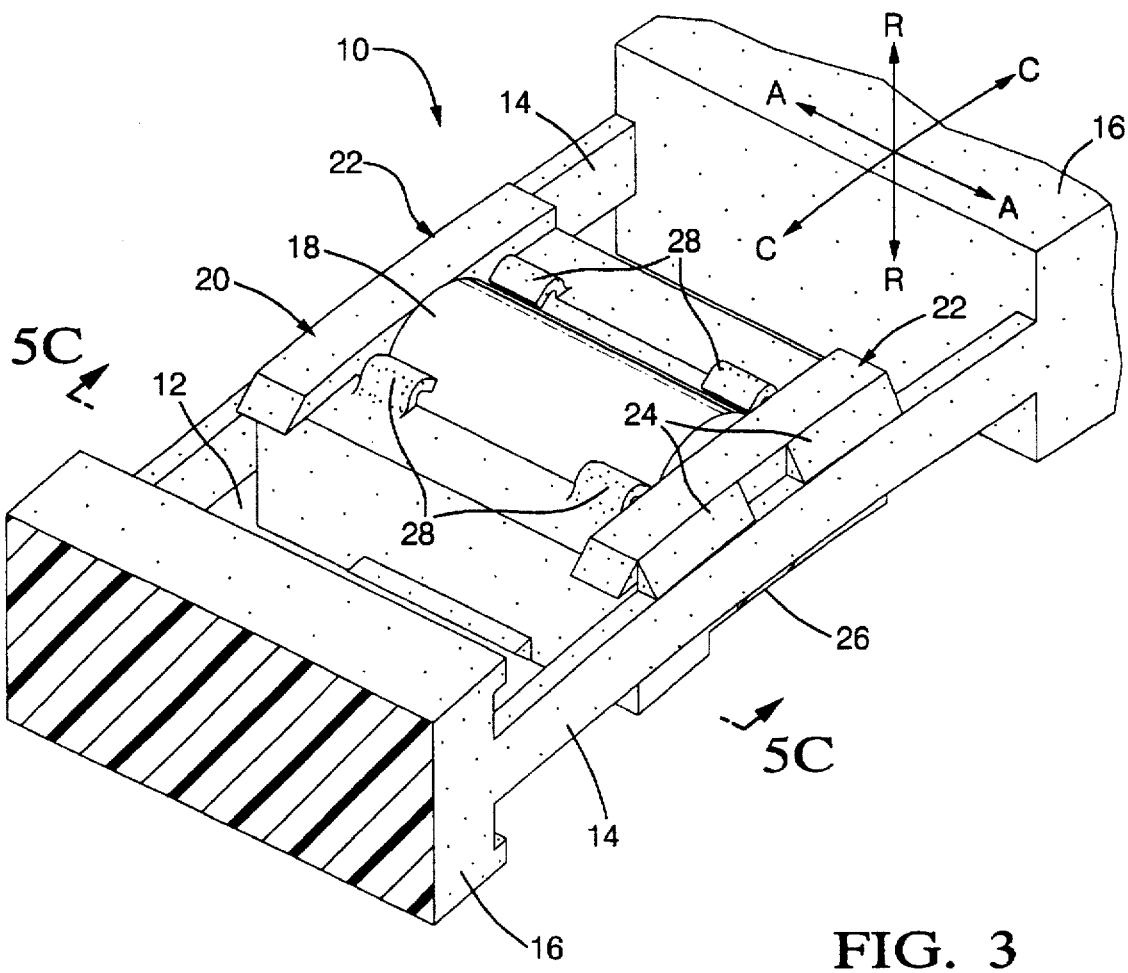
FIG. 3 is a perspective view of a car after installation into a pocket, between and to the side rails.

Referring first to FIGS. 1 and 2, a roller clutch cage, indicated generally at 10, is a molded plastic unit, molded of reinforced nylon or other durable, heat resistant material. A convenient reference frame, drawn to the side of FIG. 3, indicates the relevant directions, axial, radial, and circumferential, that serve to described the various features of cage 10. Cage 10 includes an evenly circumferentially spaced series of generally rectangular roller pockets 12, each of which is defined by an axially spaced pair of parallel side rails 14 and a pair of circumferentially spaced journal blocks 16. The journal blocks 16, as is typical, are radially thick enough to closely fill the annular space between a pair of non illustrated clutch races, and thereby keep them substantially concentric to one another. A cylindrical roller 18 fits between the pocket side rails 14, but indirectly, since it is confined within a generally rectangular molded plastic roller control car, indicated generally at 20. The pocket side rails 14 have a constant radial thickness Y, measured edge to edge, that is sufficient to render them substantially radially rigid. Both edges of each side rail 14 follow a concentric, slightly arcuate shape, which basically matches the shallow arcuate travel path that roller 18 would follow during clutch operation. The side rails 14 have a normal or free state axial separation X, measured between their inner surfaces, but each side rail 14 is axially thin enough, and with a long enough unsupported span between the bordering journal blocks 16, to be slightly axially flexible away from the other. The radial thickness Y of each pocket side rail 14 is substantially less than a journal block 16 and, as will be noted by those skilled in the plastic molding art, the side rails 14 of each pair have the same radius and a consequent complete radial overlap, as viewed axially. This would mean that the cage 10, as disclosed, could not be molded by the so called straight draw method, in which only two molds are pulled apart along a straight line. Here, radially movable mold inserts would be needed in order to create the inner surfaces of the side rails 14. While the shape of the side rails 14 disclosed is the simplest possible (their outer surfaces have no concavities or convex features, and they are totally identical and symmetrical) an alternate design of the cage 10 which could be molded without inserts is feasible, described in more detail below.

Figure 4:
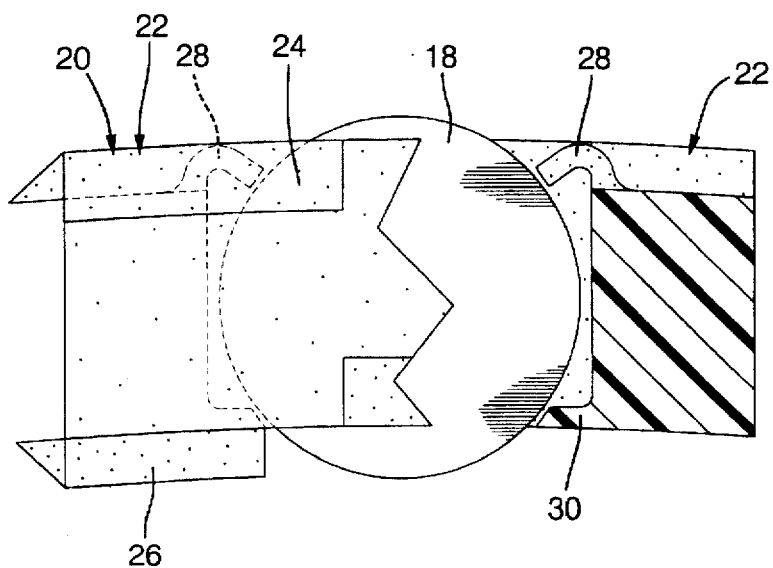
FIG. 4 is a side view of a car and installed roller with part of the end bar broken away.
Figure 5A:
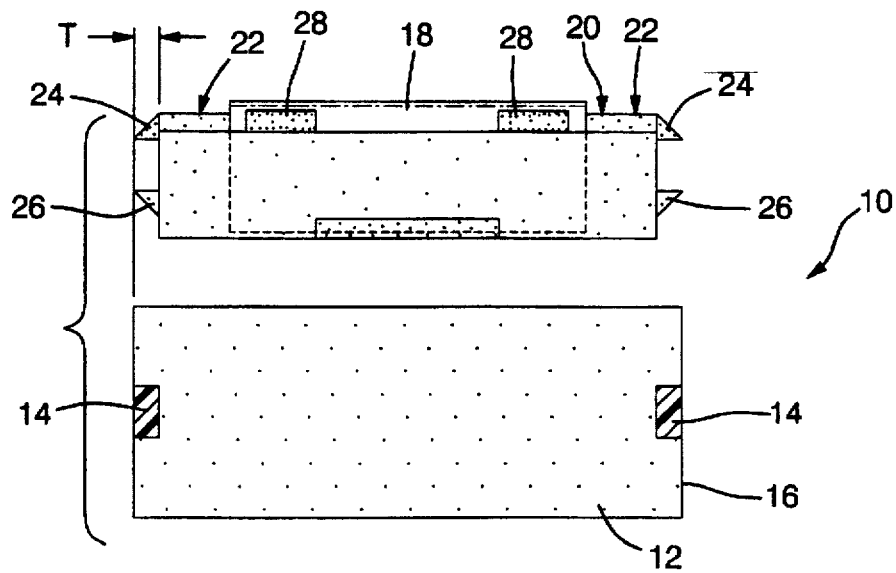
FIG. 5A is a cross section taken along the line 5A—5A of FIG. 2.

Referring next to FIGS. 1, 4 and 5A, each roller control car 20 is molded of the same plastic as cage 10, with a generally rectangular or box shape. A pair of axially spaced, parallel end bars 22 has an inner axial width slightly greater than the end to end length of a roller 18, and a basic outer axial width W just slightly less that the pocket side rail free state separation X. The end bars 22 are relatively short and thick, and the entire car 20 is substantially rigid. Extending axially outwardly of each car end bar 22 are a set of three radially spaced ribs, two upper, circumferentially spaced ribs 24 and one lower, intermediate rib 26. The ribs 24 and 26 are radially spaced apart by a distance just greater than the radial thickness of the pocket side rails 14, and have an axial extent T, indicated in FIG. 5A, that is approximately equal to the axial thickness of the side rails 14. The axial flexibility of the side rails 14 relative to each other is sufficient to accommodate the dimension T, and the radially outwardly facing surfaces of all of the ribs 24 and 26 are chamfered at about a 45 degree angle, for a purpose described below. Those knowledgeable in the molding art will recognize that the interrelationship of the ribs 24 and 26, best seen in FIG. 5A, encompassing no overlap as viewed in the radial direction, means that the entire control car 20 can, unlike cage 10, be molded by the straight draw technique, by a single pair of molds that part in the radial direction. For example, a lower mold could form both the flat surfaces of the upper ribs 24 and the chamfered surface of the intermediate lower rib 26, while an upper mold could form both the chamfered surfaces of the upper ribs 24 and the flat surface of the lower rib 26. Likewise, each end of the interior of each car 20 is molded with a set of axially spaced, upper flexible fingers 28 and a rigid, lower intermediate shelf 30, also with no overlap as viewed in the radial direction, which are capable of being molded by the same molds. These allow a roller 18 to be pop fitted into the interior of car 20 by pushing it radially inwardly, as best seen in FIG. 4, captured between the upper fingers 28 and lower shelves 30.

Figure 5B:
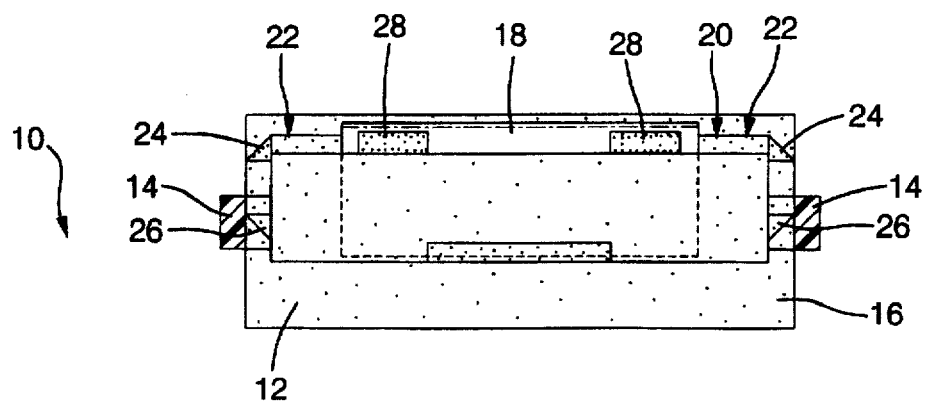
FIG. 5B is a view like FIG. 5A, but showing the roller control car forced between the pocket side rails, with the side rails flexed apart to their maximum separation.
Figure 5C:
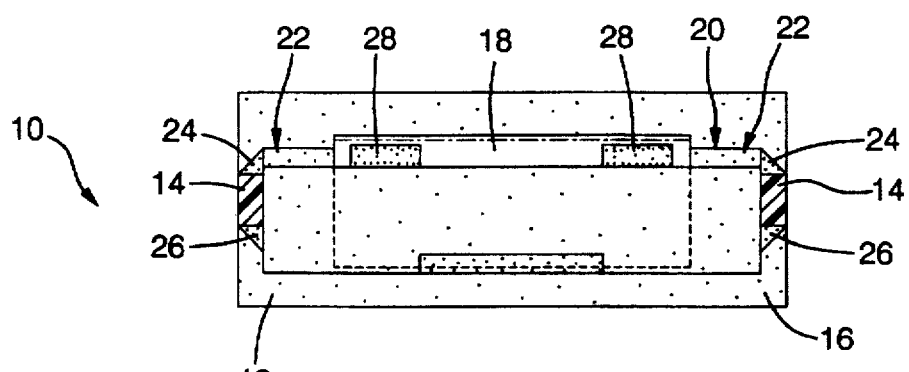
FIG. 5C is a cross section taken along the line 5C—5C of FIG. 3.

Referring next to FIGS. 5A–5C, the roller control cars 20 are installed to the cage 10 very simply. Each car 20 is axially aligned between a pair of pocket side rails 14 closely enough to assure that the chamfered outer surfaces of the lower ribs 26 hit the side rails 14. Each car 20 need only be circumferentially positioned anywhere between a pair of journal blocks 16, however. Car 20 may be so aligned either from above (radially outboard of) or below (radially inboard of) a pair of side rails but access is generally better from above, and that is what is illustrated in FIG. 5A. Then, the car 20 is pushed radially straight in between the side rails 14, as shown in FIG. 5B. The chamfered surfaces on the undersides of the ribs 26 (or ribs 24, in the other direction) and the ribs 26 wedge the side rails 14 apart. As noted above, the side rails 14 are flexible enough to accommodate the axial dimension T on both sides. Further pushing of the car 20 eventually allows the side rails 14 to snap back to their original, free state separation X, radially between and slidably captured by the radially spaced sets of ribs 24 and 26 on each side of car 20, as shown in FIG. 5C. The differential between the radial thickness Y of the side rails 14 and the radial thickness of the journal blocks 16 leaves enough radial clearance for the ribs 24 and 26. Roller 18 may be fitted into car 20 at this point, or first. Since car 20 is substantially rigid, it makes no difference to the installation process. Finally, a non illustrated conventional energizing spring would be installed between the appropriate end of a car 20 and the adjacent journal block 16. The net effect of the retention of each roller 18 in a car 20, the retention of each car 20 between a pair of side rails 14, and the capture of a spring between a car 20 and journal block 16, is that all components are solidly and robustly retained together as a unit for shipping, handling, and installation. It should be noted that neither the roller 18 nor spring is necessary to the retention of the car 20 to cage 10, unlike the two installation techniques described above Referring next to FIG. 3, after installation, the two sets of radially spaced ribs 24 and 26 serve as a track means on the side rails 14, riding closely, but sliding freely, with enough radial clearance to allow the roller 18 to roll along its travel path without binding. While that basic objective has been achieved with other roller control car designs, the advantage here is the ease of car installation into the cage. As noted, the installation locating of car 20 between a pair of journal blocks 16 is not particularly position sensitive, and the installation path is the simplest possible, a straight, short radial push. The home position is also easily sensed, visibly, audibly, and by feel, by the snap back of the rails 14, so the whole process is very amenable to automation and quick, sequential action. Should a car 20 be mislocated by partially overlapping it with a journal block 16, or side rail 14, or both, the pushing together of these relatively thick and rigid pieces would be unlikely to break the parts before the assembly machine itself was jammed or stopped by appropriate pressure sensing limit switches. This may be contrasted to the installation process described below, with the far more complex installation path of the car, and more difficult to align parts, which translates to more expensive and difficult to maintain installation apparatus. It may also be contrasted to the relatively more fragile parts that could well be overpowered and broken by the installation apparatus in case of part misalignment. While such a defect would be noted upon later part inspection, numerous parts might have to be scrapped.

Variations in the disclosed embodiment could be made, while maintaining the same basic car installation technique and its attendant advantages. For example, the track means on the car end bars could be a convex or male member, such as a single rib in the center, rather than the concave groove or trough effectively created by the radially spaced sets of ribs 24 and 26. Then, the inner surfaces of the side rails 14 could be provided with a concave groove or trough into with the single, convex rib could snap fit. Conversely, the side rails 14 could be molded with a thinner, continuous, convex arcuate ridge on their inner surfaces, with which a concave feature on the car end bars would radially interfit, rather than having the ribs 24 and 26 fit directly over the edges of the side rails 14. In that case, the radial thickness of the side rails 14 could be made significantly greater, since there would be no need to provide radial clearance for the ribs 24 and 26 to snap directly over the edges of the side rails 14. In either case, the basic installation technique and induced flexing of the side rails 14 apart from one another would remain the same. However, it would be difficult to mold either a concave or convex into the inner surfaces of the side rails 14 when the side rails 14 were directly axially opposed, as disclosed. However, a different cage design could put the side rails of the pockets on different radii, arrayed on non overlapping, but concentric arcs. This is the classic "over-under" relationship that allows cages to be straight draw molded. Then, a groove or ridge either one could easily be molded into the now easily accessed inner surfaces of the side rails, with no need for moving dies slides or inserts. Of course, the interengaging features on the car end bars would also have to be molded at matching and differing radii, but that would not be difficult to do. Therefore, it will be understood that it is not intended to limit the invention to just the embodiment disclosed.

I claim:

1. A one way roller clutch of the type having a plurality of rollers that roll circumferentially back and forth over an arcuate travel path during clutch operation, comprising, a generally annular cage having a plurality of evenly circumferentially spaced roller pockets, each of which is defined by a pair of circumferentially extending, axially spaced and parallel side rails deployed generally along said roller travel path, said side rails having a predetermined free state axial separation with at least one said side rail of each pair being resiliently axially flexible relative to the other, a plurality of substantially rigid roller control cars, each of which has a pair of axially spaced end bars with a basic axial width substantially equal to the free state separation of said pair of pocket side rails, said end bars further having a track thereon extending axially past the basic axial width of said pocket side rails and closely but freely radially interfitting with said side rails, whereby each of said roller cars may be fitted within a roller pocket by radially forcing said control car end bars between said pocket side rails, thereby resiliently flexing said side rails axially apart until said track means radially interfits with said side rails, after which said roller car may slide axially back and forth on said side rails without separation from said cage.

2. A one way roller clutch of the type having a plurality of rollers that roll circumferentially back and forth over an arcuate travel path during clutch operation, comprising, a generally annular cage having a plurality of evenly circumferentially spaced roller pockets, each of which is defined by a pair of circumferentially extending, axially spaced and parallel side rails deployed generally along said roller travel path, said side rails having a predetermined free state axial separation with at least one said side rail of each pair being resiliently axially flexible relative to the other, a plurality of substantially rigid roller control cars, each of which has a pair of axially spaced end bars with a basic axial width substantially equal to the free state separation of said pair of pocket side rails, said end bars further having a set of radially spaced ribs thereon extending axially past the basic axial width of said pocket side rails and closely but freely radially interfitting with said side rails, whereby each of said roller cars may be fitted within a roller pocket by radially forcing said control car end bars between said pocket side rails, thereby resiliently flexing said side rails axially apart until said radially spaced ribs interfit with said side rails, after which said roller car may slide axially back and forth on said side rails without separation from said cage.

3. A one way roller clutch of the type having a plurality of rollers that roll circumferentially back and forth over an arcuate travel path during clutch operation, comprising, a generally annular cage having a plurality of evenly circumferentially spaced roller pockets, each of which is defined by a pair of circumferentially spaced journal blocks joined by a pair of axially spaced and parallel side rails deployed generally along said roller travel path, said side rails having a predetermined radial thickness less than said journal blocks and a free state axial separation with at least one said side rail of each pair being resiliently axially flexible relative to the other, a plurality of substantially rigid roller control cars, each of which has a pair of axially spaced end bars with a basic axial width substantially equal to the free state separation of said pair of pocket side rails, said end bars further having a set of radially spaced ribs thereon extending axially past the basic axial width of said pocket side rails and closely but freely radially interfitting over said side rails, whereby each of said roller cars may be fitted within a roller pocket by radially forcing said control car end bars between said pocket side rails, thereby resiliently flexing said side rails axially apart until said radially spaced ribs interfit over said side rails, after which said roller car may slide axially back and forth on said side rails without separation from said cage.

* * * * *